Nov. 24, 1942.   H. M. SCHLEICHER   2,303,303
FORMS FOR SLIP-CASTING CERAMICS AND METHOD OF MAKING THE SAME
Filed April 14, 1941   2 Sheets-Sheet 1
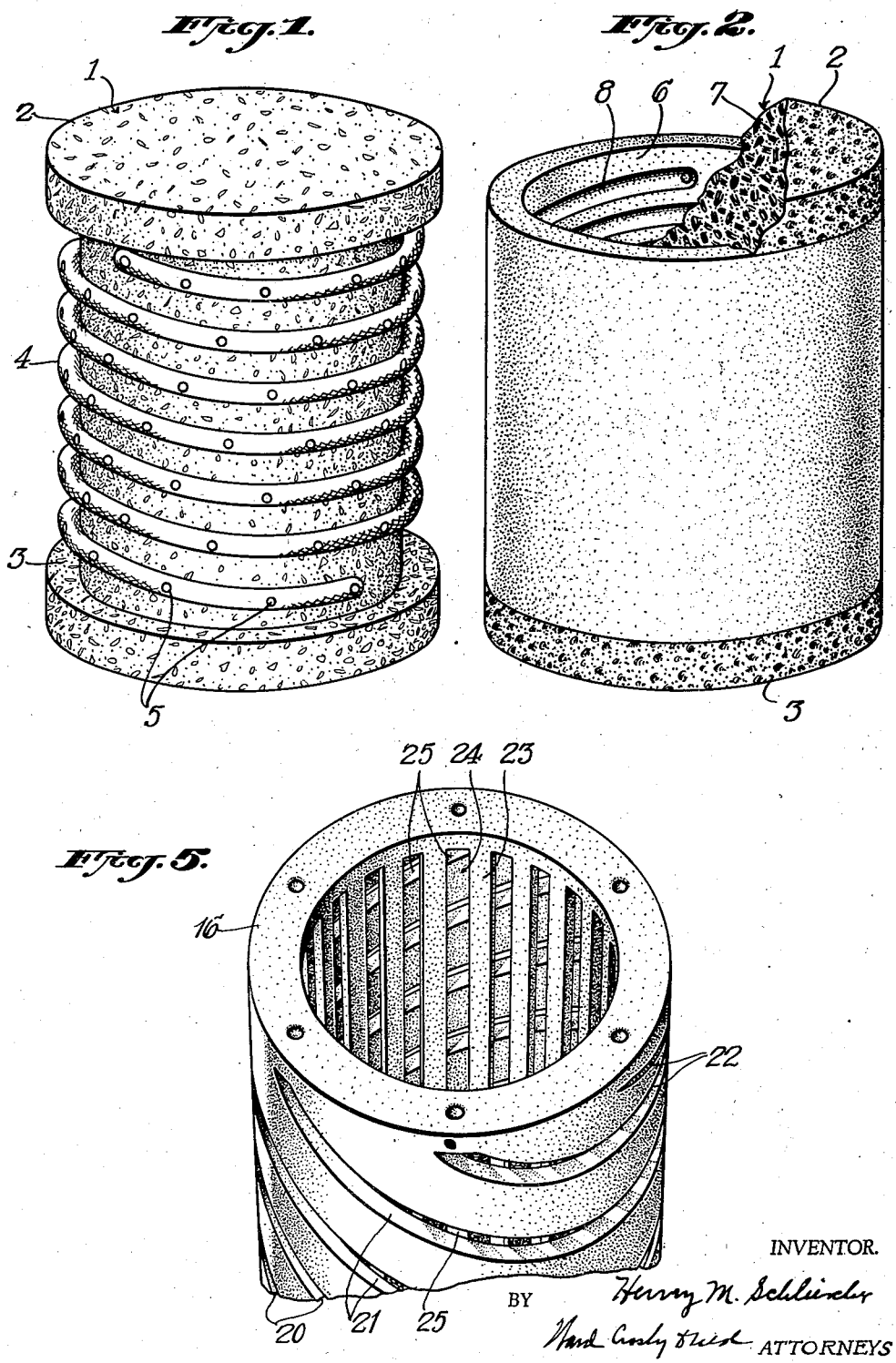
INVENTOR.
Harry M. Schleicher
BY
ATTORNEYS Nov. 24, 1942.                H. M. SCHLEICHER                2,303,303
         FORMS FOR SLIP-CASTING CERAMICS AND METHOD OF MAKING THE SAME
                  Filed April 14, 1941              2 Sheets-Sheet 2
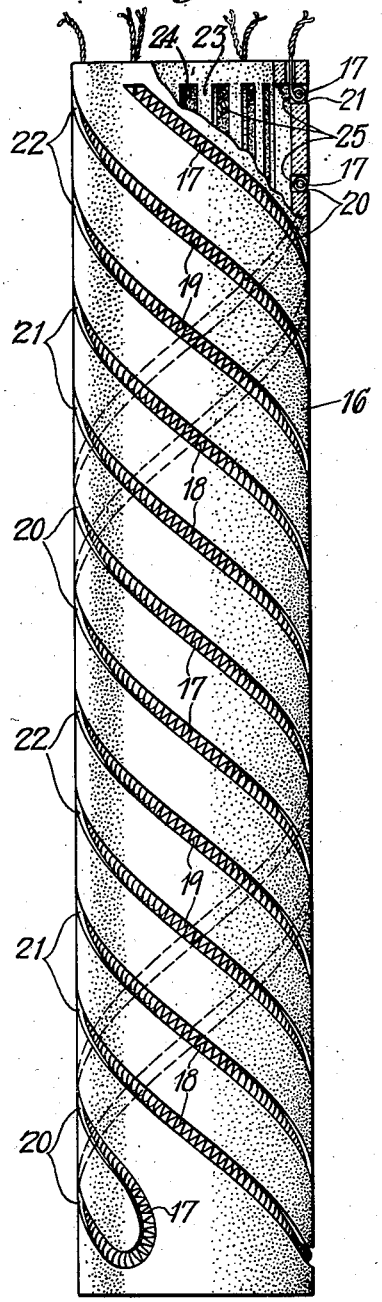
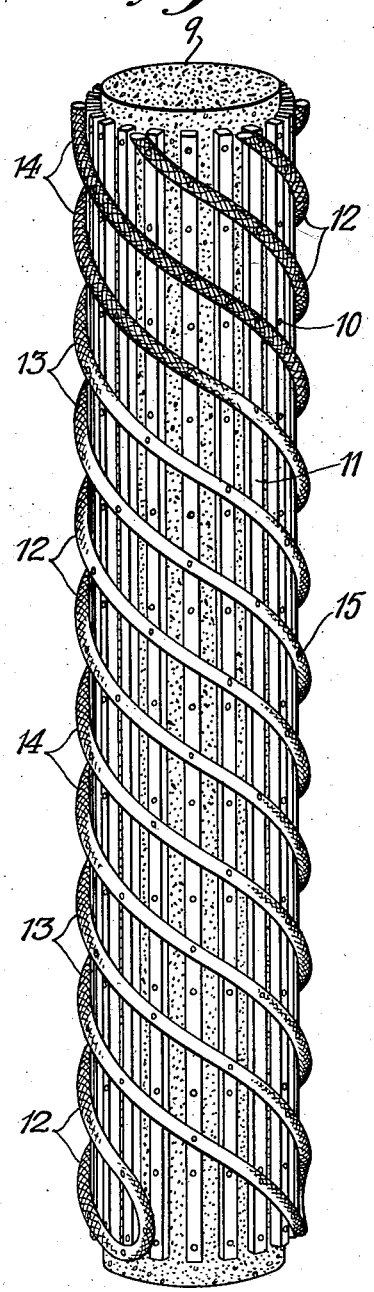
INVENTOR.
Henry M. Schleicher
BY
ATTORNEYS Patented Nov. 24, 1942

2,303,303

UNITED STATES PATENT OFFICE 2,303,303

FORM FOR SLIP-CASTING CERAMICS AND METHOD OF MAKING THE SAME

Henry M. Schleicher, Elizabeth, N. J., assignor to Scovill Manufacturing Company, Waterbury, Conn., a corporation of Connecticut Application April 14, 1941, Serial No. 388,437

20 Claims. (Cl. 25—129)

The present invention relates to the art of making ceramic shapes, and more especially to the forms therefor and method of producing the same and the method of producing the shapes in and on said forms. The customary procedures for the manufacture of ceramic shapes may be divided into two classes, one, where the molding of the shapes is done in forms which are substantially impervious to liquid, as by pressure, by ramming or by casting; and the other, by slip-casting, that is using forms (whether core or mold) which absorb liquid from the ceramic slip. The term "slip-casting" as used herein denotes not only the more common procedure where the relatively thin slip is poured into the absorbent mold and allowed to remain until enough of the ceramic substance has compacted to form the desired thickness and any excess removed, but also where the ceramic mix is applied to an absorbent form in a considerably less liquid condition, even as a thick paste. The present invention relates more especially to slip-casting in this broad meaning of the term, in that the forms are absorptive, and it has particular application in cases where the ceramic shapes cannot be removed from the forms without destruction of the latter. Such cases include cores and also molds where the ceramic body is locked in the mold by reason of its shape. The forms may take the shape of a mold into which the slip is poured or a core on which the ceramic mix is placed to the desired dimensions; and as will be well understood by those skilled in the art, in the use of molds the walls of the interior cavity form the surface on which the ceramic mix takes its shape, while in the case of cores the outer surface forms the surface to which the ceramic mix is applied. The term "casting" is accordingly intended to comprehend forming on cores or in molds.

The invention has been found to be particularly useful in the manufacture of refractory ceramics in various complicated shapes and sizes, and more especially zirconium refractories. Since the casting of zircon shapes presents not only some of the difficulties experienced in the casting of other ceramics, but additional difficulties, it is believed that the various advantages of the invention as applied to various specific purposes can best be understood and appreciated from a description of the invention as applied more especially to zircon ceramics, which is specifically discussed below, by way of example, it being understood that other ceramic mixtures may be similarly treated.

Heretofore the making of complicated zircon refractory shapes, such as involve the destruction of the forms to strip the ceramic body, has been attempted with the use of plaster of Paris forms which must be baked at the time of baking the shapes, but the use of such forms has presented various difficulties. For example, in the use of plaster of Paris cores and molds, the zircon shapes tend to crack during heating; and furthermore, plaster of Paris cannot be satisfactorily removed from the zircon shapes after baking. An additional difficulty arose where phosphoric acid was used in the zircon mix as a bonding agent, since this agent was present in the mix as a liquid and its absorption by the plaster of Paris from the zircon mix rendered the plaster very hard, strong and resistant to disintegration when heated. Furthermore, in slip-casting zircon mixtures including phosphoric acid (the use of which mixtures is well known in the art) it has been found that in some instances the plaster of Paris forms did not present the degree of absorption desired for the relatively denser acid constituent of the slip, which absorption by the form is necessary to increase the density of the slip to render it sufficiently compact in a reasonable time.

An object of the invention is to provide improved forms for the casting of ceramic shapes, a method of producing such forms and an improved method of casting such shapes by the use of said forms.

Another object of the invention is to provide forms which are free from the difficulties such as are above referred to in connection with plaster of Paris forms, and to provide a method of making such improved forms which lends itself to economy and efficiency in manufacture.

Another object of the invention is to provide an economical and expeditious method of manufacturing ceramic shapes, and more especially zircon refractories by the use of such forms.

The invention comprises the method of producing ceramics by the use of improved casting forms, said forms and the method of making the same.

Other objects and advantages of the invention will more fully appear from the following description and the examples set forth by way of illustration, taken in conjunction with the drawings which illustrate by way of example certain of the forms and shapes and in which:

Fig. 1 is a perspective view of a core form for producing a cast ceramic shape having an inside helical groove;

Fig. 2 is a perspective view showing the core form of Fig. 1 (partly broken away) with the baked ceramic shape thereon;

Fig. 3 is a perspective view of a core form for producing a cast ceramic shape having outside helical grooves;

Fig. 4 is a side elevation of the shape cast on the form of Fig. 3 and shows the use for which said shape is intended; and Fig. 5 is a somewhat enlarged perspective view of a portion of Fig. 4 showing the interior configuration.

Before describing the invention in further detail, and in order to better understand the invention, a brief general description will be given of certain forms and the shapes cast thereon, which are made in accordance with the invention and illustrate certain phases of the invention to be more particularly described following.

In Fig. 1, a core form body 1 is provided with end flanges 2 and 3 and a continuous strip of sash cord or the like 4 is helically wound around the body 1 and secured in place as by nails 5 driven into the core body: this means of attachment of said configuration being facilitated by the special character of the body material as will hereinafter more fully appear. In Fig. 2 a ceramic shape 6 (in the present embodiment a zircon refractory) is shown on the above-described core form after casting and firing. A portion of the core has been broken away as at 7 showing the interior of the shape 6 with the helical interior groove 8 formed by the sash cord 4; the breaking away of said core material being facilitated by the special frangible nature of said body material.

In Fig. 3, 9 is a cylindrical body of a core form to which is secured as by nails 10 a plurality of strips of wood 11 spaced peripherally and extending axially of said body 9. In the present embodiment the body is of the order of 3 inches in diameter and 20 inches long. A plurality of continuous strips 12, 13 and 14, such as sash cord, are wound around the strips and are fastened thereto as by nails 15. The ceramic shape 16 (Fig. 4) (in the present embodiment a zircon refractory), which was made on the form of Fig. 3, is shown after the form has been removed therefrom. This shape is intended for use in an electrical heating unit and the three sets of electrical coils 17, 18 and 19 are illustrated in position in grooves 20, 21 and 22 corresponding to the strips 12, 13 and 14 of the core shown in Fig. 3. In the enlarged partial view of the shape 16 shown in Fig. 5, the interior ribs 23 and intervening channels 24 illustrate the structural features resulting from the axially extending strips 11. It is particularly noted that the core configuration produces openings such as 25 into the channels 24, thus providing a means of communication between the grooves 20, 21 and 22 and the interior of the ceramic shape: these openings being desirable to liberate heat from the coils 12, 13 and 14 inwardly of the unit.

The shape illustrated in Figs. 4 and 5 is of such a character that in the relative proportions indicated it would be difficult if not impossible to produce the same with the facility and economy made possible by this invention, which permits the easy breaking up and removal of the core even in such a small internal diameter and relatively great length as provided by said shape. Other and further forms (both core and mold) of any desired shape and size may be made in accordance with this invention, as will be well understood by those skilled in this art after understanding said invention.

I have found that a mixture of comminuted wood, plaster of Paris and water provides a highly satisfactory mixture for producing such forms, and the forms produced thereby are wholly satisfactory. The comminuted wood may either be in the form of sawdust or wood flour, depending upon the particular uses to which the form is to be put and the manner of making the form.

The sawdust is the by-product of the ordinary lumber mill whereas the wood flour is a specially prepared product and naturally costs more than sawdust. Since the forms under discussion are used only once in most cases, the matter of cost is more material than in the case of forms which are used repeatedly.

The run-of-mill sawdust is considerably coarser than wood flour, and when used, the coarser part of the sawdust is removed by screening, usually on an 8 mesh sieve and only the undersize used.

The following table gives the result of a screening test on one lot of sawdust, on that portion passing an 8 mesh sieve.

| Mesh | By volume, loose condition | By weight |
|---|---|---|
| | Per cent | Per cent |
| −8+14 | 27.0 | 22.4 |
| −14+20 | 25.8 | 24.6 |
| −20+40 | 31.9 | 34.7 |
| −40+60 | 9.8 | 11.5 |
| −60+100 | 3.0 | 4.5 |
| −100 | 2.5 | 2.3 |
| | 100.0 | 100.0 |

One pound of this sawdust measured about 1500 ccs. in loose condition.

Wood flour may be obtained of different types. A suitable type has elongated particles and is of a size that will just pass a 100 mesh screen. In the alternative, sawdust passing through a 100 mesh screen may be used in place of wood flour; but, in view of the cost of screening to this fineness, would probably entail no saving.

The sawdust ordinarily used is chiefly pine wood or the like. The wood flour ordinarily used is maple wood. While I have found that pine wood or the like sawdust and maple wood flour have proven to be entirely satisfactory, nevertheless it is within the contemplation of the invention that other woods may be used, and after an understanding of the invention the use of other suitable woods will be fully appreciated by those skilled in the art.

The particle size of the comminuted wood to use depends upon the particular use to which the form is to be put and the manner of making the form. The coarser sizes have less effect on the setting time and result in a stronger and harder form. Less of the wood flour may be used to achieve the same hardness and strength, but not enough less to compensate for the difference in cost.

Forms made with sawdust give rougher surfaces when machined and the surface of a refractory body formed against such a surface would also be correspondingly rough. However, when a smooth surface is desired two courses are open, one, to apply a coating mixture of plaster and wood flour to the rough surface of the form or to use a plaster-wood flour mixture for the form. A coating mixture which has been found entirely satisfactory consists of 60 parts plaster to 40 parts wood flour with sufficient water to form a paintlike consistency and is applied with a brush. The coating may be cut or smoothed with sandpaper to finished shape.

For most purposes I have found the sawdust-plaster mixture entirely suitable.

The proportions of plaster and wood may vary according to the circumstances. For sawdust the lower limit is about 40% by volume, below that quantity the plaster form is too hard and is likely to crack a refractory body formed on or in it.

The upper limit for sawdust, when a form is to be strong enough to withstand machining, or to have strips of wood or cord nailed to it (as in Figs. 1 and 3), is about 60%, by volume. If a form is to be used directly where the rigidity of the surface can be rather low, as much as 80% sawdust by volume can be used. Less volume of wood flour than sawdust is permissible for the same purpose because it has a greater weakening effect on the plaster. A suitable proportion is 60 parts plaster to 40 parts wood flour by volume.

For most purposes the plaster and sawdust are in about equal proportions by volume or of the same general order of proportions.

The following formula, based on this proportion, is convenient for practical purposes, for making molds and cores for use in producing zircon refractory shapes.

|  | Cubic centimeters |
|---|---|
| Pottery plaster (a form of plaster of Paris) (loose condition) | 730 |
| Sawdust (as described, loose condition) | 730 |
| Water | 600 |

The above amount is sufficient for practical working purposes to produce a mix for making a total volume of forms of approximately 1000 cc. including the loss of the mix by sticking to the container in which it is prepared and to the tools for handling it. The above formula gives a mixture which flows readily and the resulting forms have suitable characteristics for the purpose intended.

The sawdust and plaster are preferably thoroughly mixed dry and the water is thereafter added. It is found that the slight swelling of the wood particles when wetted has no deleterious effect at any time. The form can be dried and subsequently moistened again (when the refractory mix is applied) without appreciable damage. The mixture may be molded to the desired shape or may be molded to an approximate shape or rough size and thereafter be formed by machining or the like cutting operation either while wet or after drying. The molded mixture is sufficiently string for necessary manipulation and nails can be driven into it (as when applying configuration such as those in Figs. 1 and 3) and the mold has a strong absorptive power thus facilitating the production of the zircon shape.

There seems to be practically no tendency for the zircon shape to become undetachably bonded to the core or mold or to crack or deform, the latter being due to the fact that the strength of the form is less than that of the ceramic being cast therein or thereon, after the ceramic shape has set. Furthermore, when the refractory mix is subjected to heat, as hereinafter described, while in or on the form, the wood particles within the form are consumed and the cores or molds are soft and readily broken up for removal from the refractory shapes. For example, after baking at about 600° F., the wood is burned up, or otherwise altered, leaving a porous structure which is quite frangible.

Minor amounts of setting retardants (such as those present in so-called mason's or painter's plaster) are not objectionable as a part of the form mix. For example, mason's or painter's plaster may be used in place of the plaster of Paris ingredient, but such use appreciably slows up the setting of the forms. Hence it is preferred that a plaster of Paris which is substantially free from setting retardants be used. One such preferred form of plaster of Paris is pottery plaster. Also, where the forms to be cast are zircon refractories, the use of fillers in the plaster of Paris, or as an additional ingredient to the mix of plaster of Paris and wood, is not desirable as a usual rule, because of the danger of hardening the forms as a consequence of the action between certain fillers and ingredients of the zircon mix.

The following example of a zircon refractory (not claimed per se) is set forth by way of example in order to explain the method of producing a refractory body (such as 6, Fig. 2, or 16, Figs. 4 and 5) in accordance with this invention; it being here noted that several other bonded zirconium refractories (i. e., those consisting in large measure of zircon or zircon and zirconia) are well known to those skilled in the art.

|  | Parts |
|---|---|
| Grain zircon | 0–47 |
| Milled zircon | 92–45 |
| Aluminum hydroxide | 2 |
| $P_2O_5$ as 85% orthophosphoric acid | 6 |

Add water to consistency of heavy cream and digest or age. Then bring to the desired consistency by adding water or by evaporation of excess water, as necessary. A density of 2.0 to 2.3 is suitable for use in molds. A thick paste is used for application to cores with a trowel or spatula and an intermediate consistency for "painting."

Grain zircon may be omitted for very small objects. For most purposes it is desirable to use a grog mixture, especially for larger bodies, as is well known in the art. A suitable grog is prepared according to the formula selected, as for instance where the grain and milled zircon are in equivalent amounts, and after firing, is crushed to a suitable size. For large bodies the size of such grog may be 8 mesh, 14 or 20 mesh for medium size, and 40 mesh for smaller and thinner parts. The mixes are then made up of grog and further original ingredients in suitable proportions, usually 60% grog and 40% additional ingredients.

Slip-casting is conducted in the known manner except that the refractory body is not stripped from the mold as in the regular procedure. In the use of a core form (such as shown in Figs. 1 and 3), the zircon mixture, of a consistency of a heavy paste, is applied with a trowel or spatula or other suitable tool. Or in a thick paint consistency it may be "painted" on with a brush. The zircon mixture adheres very well and becomes compacted by the absorption of the form or attached parts thereof, such as sash cord, etc. Sometimes it is necessary or desirable to reduce or inhibit the absorptive power of the cores and molds as by wetting, varnishing, shellacking or applying oil, to thereby inhibit the absorptive properties of the form to the degree desired. Otherwise, too much of the phosphoric acid in the zircon mixture is absorbed, rendering the zircon shapes insufficiently strong. By the use of such absorption inhibitors, the absorptive properties of the form may be predetermined in accordance with the character and composition of the slip.

It is often desirable to use additional phosphoric acid in the zircon mix to help compensate for that lost in absorption. Furthermore, after a refractory body has been made according to this invention and has been fired and the strength and hardness are not as great as desired, these properties may be increased by soaking the body in phosphoric acid and refiring in accordance with the invention described and claimed in copending application Serial No. 388,439, filed April 14, 1941.

As previously indicated, where a bonding agent such as phosphoric acid is present in the zircon mix in the form of a liquid, the use of the plaster-sawdust forms is especially useful whether the forms be molds or cores and whatever the shape desired for the refractory casting.

The following formula (which per se is not claimed herein but forms a part of the subject matter of copending application Ser. No. 388,439, filed April 14, 1941) is given as another example of a zircon mixture, as illustrating such a mixture in which no liquid bonding agent is present in the slip:

| | Per cent |
|---|---|
| Grain zircon | 0 to 47 |
| Milled zircon | 96 to 47 |
| China clay | 4 to 6 |

Water sufficient to produce desired fluidity for slip-casting (preferably a density of 1.6 when used in molds).

This mixture is applied to the mold or core forms in the manner previously described above. In accordance with the invention of said copending application Ser. No. 388,439 the zircon-clay shapes may be materially strengthened by treatment, after firing and removal from the forms, with phosphoric acid and refining.

While the plaster-wood forms may be used to advantage in the production of all manner of shapes cast from the zircon-clay mixture, neverthelesss said forms are especially useful where the zircon-clay mixture is applied to a core. The plaster-wood form is of especial advantage, since without the unique characteristics of said form, the core expansion would be detrimental to the cast shape. Also, where the zircon shape is such as to necessitate breaking the mold to remove the shape, the use of said plaster-sawdust mold is especially advantageous.

After the mixture to be cast is applied to the form, either by pouring into the mold or coating or "painting" onto the core, the form and applied ceramic are brought to the temperature desired for the particular ceramic, and since the heat thus applied in the baking or firing of the ceramic is sufficient to destroy the wood particles, the said wood particles will be destroyed by such heat, thus making a frangible form which may be removed by breaking it with a suitable instrument. For example, the forms and applied zircon mix may be dried at 180°–200° F., baked at 300°–600° F., the shapes are then stripped from the forms and the shapes finally fired at a higher temperature, say 2300° F.

Having thus described my invention with particularity with reference to the preferred casting forms and the preferred method of producing and utilizing the same, and having referred to some of the possible modifications of the invention, it will be obvious to those skilled in the art, after understanding the invention, that other changes and modifications may be made therein without departing from the spirit and scope of the invention, and it is aimed in the appended claims to cover such changes as come within the scope of the invention.

What I claim is:

1. A form for casting ceramics, comprising a body portion consisting substantially entirely of a mixture of water and plaster of Paris and comminuted wood dispersed therethrough in an amount of at least 40% by volume of the combined plaster and comminuted wood to produce softness and friability upon baking at about 600° F. to thereby provide a strength of said baked mold of less than the strength of the ceramic to be cast thereby.

2. A form for slip-casting ceramics, comprising a body structure consisting substantially entirely of set plaster of Paris provided with spaces dispersed therein, and wood particles positioned in said spaces in said body structure, said wood particles being so proportioned and disposed relative to said set plaster of Paris body structure as to provide for absorption of liquid from the slip while maintaining the form against destructive expansion due to the swelling of said wood particles by said liquid.

3. A form for slip-casting ceramics, comprising a body structure consisting substantially entirely of set plaster of Paris provided with spaces dispersed therein, wood particles positioned in said spaces in said body structure, and an absorption controlling coating on said form, said wood particles and said coating being so proportioned and disposed relative to said set plaster of Paris body structure as to provide for a predetermined degree of absorption of liquid from the slip while maintaining the form against destructive expansion due to the swelling of said wood particles by said liquid.

4. A form for slip-casting ceramics, comprising plaster of Paris and comminuted wood in proportions by volume in loose condition of 40–80% wood particles and substantially 60–20% of plaster of Paris, wherein the wood particles are positioned in spaces in a plaster body structure to thereby provide for absorption of liquid from the slip while maintaining the form against destructive expansion due to the swelling of said wood particles by said liquid.

5. A form for slip-casting ceramics, having a body comprising a major content of plaster of Paris and relatively fine wood sawdust in substantially equal proportions by volume when in loose condition and a surface coating comprising a major content of plaster of Paris and wood flour in substantially equal proportions by volume when in loose condition.

6. A form for slip-casting ceramics, having a body comprising 40–60% by volume when in loose condition of plaster of Paris and 60–40% by volume when in loose condition of relatively fine wood sawdust and a surface coating comprising 60–40% by volume when in loose condition of plaster of Paris and 60–40% by volume when in loose condition of wood flour.

7. A form for casting ceramics, comprising a body having a plaster of Paris cellular structure with wood particles positioned in cellular spaces dispersed therethrough resulting from a plastic mixture comprising said plaster and wood in the proportions of 40–60% plaster and 60–40% wood and water, and configurations affixed to the form surface of said body by fastenings inserted into said body.

8. A core for casting ceramics, comprising a body having a plaster of Paris cellular structure with wood particles positioned in cellular spaces dispersed therethrough resulting from a plastic mixture comprising said plaster and wood in the proportions of 40–60% plaster and 60–40% wood and water, and a plurality of circumferentially spaced axially extending elongated strip material members affixed to said body and providing ribs extending outwardly from the casting surface thereof and secured thereto by fastening members passing through said strips and into said body, and a relatively flexible strip positioned exteriorly of and extending in a direction transverse to said ribs and being affixed to said body so as to form an integral part of said core.

9. The method of making forms for casting ceramics which comprises the following steps, preparing a mixture comprising plaster of Paris, comminuted wood and water wherein the plaster of Paris and comminuted wood are in proportions by volume in loose condition of 20–60% of said plaster and 80–40% of said wood and their combined volume is a major portion of the total volume of the mixture and the water is in an amount sufficient to produce a moldable mix, and forming said mixture into the desired shape.

10. The method of making forms for casting ceramics which comprises the following steps, preparing a mixture comprising plaster of Paris, comminuted wood and water wherein the plaster of Paris and comminuted wood are in proportions by volume in loose condition of 40–60% of said plaster and 60–40% of said wood and their combined volume is a major portion of the total volume of the mixture and the water is in an amount sufficient to produce a moldable mix, forming said mixture into the desired shape to provide a cellular plaster body structure with said wood particles positioned in cellular spaces dispersed therethrough, and fastening a configuration over the casting surface of said body by inserting fastening members through said configuration and into said body.

11. The method of making cores for casting ceramics which comprises the following steps, preparing a mixture comprising plaster of Paris, comminuted wood and water wherein the plaster of Paris and comminuted wood are in proportions by volume in loose condition of 40–60% of said plaster and 60–40% of said wood and their combined volume is a major portion of the total volume of the mixture and the water is in an amount sufficient to produce a moldable mix, forming said mixture into the desired shape to provide a cellular plaster core body structure with wood particles positioned in cellular spaces dispersed throughout said core body, and fastening a configuration to the exterior of said core body by inserting fastening members through said configuration and into said core body.

12. The method of making forms for casting ceramics which comprises the following steps, mixing together plaster of Paris and comminuted wood in substantially the proportions by volume in loose condition of 20–60% wood and 80–40% plaster and water in an amount sufficient to produce a moldable mix, and molding the resulting batch.

13. The method of making forms for casting ceramics which comprises the following steps, thoroughly mixing while relatively dry plaster of Paris and comminuted wood in substantially the proportions by volume in loose condition of 40–60% wood and 60–40% plaster, adding water to said mixture in an amount sufficient to produce a moldable mix, and molding the resulting batch.

14. The method of making forms for casting refractories which comprises the following steps, mixing together plaster of Paris, pine or the like wood sawdust the major portion of which is the undersize of an 8 mesh sieve and water in the relative proportions of about 73 parts by volume in loose condition of each said plaster and sawdust and about 60 parts by volume of water and molding the resulting batch.

15. The method of making forms for casting ceramics which comprises the following steps, preparing a mixture comprising plaster of Paris, comminuted wood and water, wherein the plaster of Paris and comminuted wood are in proportions by volume in loose condition of 20–60% of said plaster and 60–80% of said wood and their combined volume is a major portion of the total volume of the mixture and the water is in an amount sufficient to product a moldable mix, forming said mixture into the desired shape and thereafter applying to the surface of said form a finishing coat comprising a mixture of comminuted wood of the order of fineness of about 100 mesh, plaster of Paris and water, wherein the wood and plaster of Paris are in proportions by volume in loose condition of 20–60% of said plaster and 80–40% of said wood and their combined volume is a major portion of the total volume of the coating mixture and the water is in an amount sufficient to produce a coating mix.

16. Method of slip-casting ceramic shapes which comprises applying a slip of the ceramic mixture to the surface of a casting form comprising a major content of plaster of Paris and comminuted wood, wherein the wood particles are positioned in spaces in a plaster body structure whereby liquid from the slip is absorbed by the form and the form is maintained against destructive expansion resulting from the swelling of said wood particles, and then drying and baking said form and ceramic shape.

17. Method of slip-casting ceramic shapes which comprises applying a slip of the ceramic mixture to the surface of a casting form comprising a major content of plaster of Paris and comminuted wood in proportions of 20–60% of said plaster and 80–40% of said wood when measured by volume in loose condition, whereby the density of the slip is increased, baking said form and ceramic to a temperature of approximately 600° F., whereby after the ceramic shape has been heated to the desired temperature the form may be readily broken up and removed from the ceramic shape thus produced without damage to the ceramic shape.

18. Method of slip-casting ceramic shapes which comprises applying a slip of the ceramic mixture to the surface of a casting form comprising a major content of plaster of Paris and comminuted wood in proportions of 20–60% of said plaster and 80–40% of said wood when measured by volume in loose condition and said form being provided with an absorptive inhibiting material, whereby the density of the slip is increased as predetermined by said inhibiting material, baking said form and ceramic to a temperature of approximately 600° F., whereby after the ceramic shape has been heated to the desired temperature the form may be readily broken up and removed from the ceramic shape thus produced without damage to the ceramic shape.

19. Method of slip-casting zirconium refractory shapes, wherein a bonding agent is present in the zirconium mix as a liquid, which comprises applying a slip of the ceramic mixture to the surface of a casting form comprising a major content of plaster of Paris and comminuted wood in proportions of 20–60% of said plaster and 80–40% of said wood when measured by volume in loose condition, whereby the density of the slip is increased, baking said form and zirconium shape to a temperature of approximately 600° F., whereby after said shape has been heated to the desired temperature the form may be readily broken up and removed from the shape thus produced without damage to the shape.

20. Method of slip-casting zirconium refractory shapes, wherein a bonding agent is present in the zirconium mix as a liquid, which comprises applying a slip of the mix to the surface of a casting form comprising a major content of plaster of Paris and comminuted wood in proportions of 20–60% of said plaster and 80–40% of said wood when measured by volume in loose condition, whereby the density of the slip is increased, drying said form and shape at about 180–200° F., then baking said form and shape to a temperature of approximately 300–600° F., separating the shape from the form, and firing said shape to approximately 2300° F.

HENRY M. SCHLEICHER.